(12) United States Patent
Tripathi (10) Patent No.: US 8,165,257 B2
(45) Date of Patent: Apr. 24, 2012

(54) METHODS AND APPARATUS FOR INTERFACE BUFFER MANAGEMENT AND CLOCK COMPENSATION IN DATA TRANSFERS

(75) Inventor: Brijesh Tripathi, Whitehall, PA (US)

(73) Assignee: Agere Systems Inc., Allentown, PA (US)

( * ) Notice: Subject to any disclaimer, the term of this patent is extended or adjusted under 35 U.S.C. 154(b) by 722 days.

(21) Appl. No.: 12/321,835

(22) Filed: Jan. 26, 2009

(65) Prior Publication Data
US 2009/0141844 A1 Jun. 4, 2009

Related U.S. Application Data

(63) Continuation of application No. 10/993,542, filed on Nov. 19, 2004, now Pat. No. 7,499,516.

(51) Int. Cl.
*H04L 7/00* (2006.01)
*H04L 25/00* (2006.01)
*H04L 25/40* (2006.01)

(52) U.S. Cl. .................. 375/372; 710/52; 710/310
(58) Field of Classification Search .................. 375/372; 710/52, 310
See application file for complete search history.

(56) References Cited

U.S. PATENT DOCUMENTS

| | | | |
|---|---|---|---|
| 5,664,150 A | 9/1997 | Isaac et al. | 711/143 |
| 6,693,918 B1 | 2/2004 | Dallabetta et al. | 370/503 |
| 7,289,494 B2 | 10/2007 | Lakkis | 370/366 |
| 8,073,040 B1 * | 12/2011 | Chan et al. | 375/219 |
| 2003/0079060 A1 | 4/2003 | Dunlop | 710/5 |
| 2004/0032282 A1 | 2/2004 | Lee et al. | 326/39 |

OTHER PUBLICATIONS

"RapidIO™ Interconnect Specification Part VI; Physical Layer 1×4× LP-Serial Specification", RapidIO Trade Association, Rev. 1.2, Jun. 2002, Copyright 2002 Rapidiio Trade Assoc.

* cited by examiner

*Primary Examiner* — Curtis Odom (57) ABSTRACT

A circuit for data stream buffer management, lane alignment, and clock compensation of data transfers across a clock boundary using a single first in first out (FIFO) buffer in each serial channel is described. The RapidIO® data channel, for example, operates using a clock recovered from the data stream. The RapidIO® data stream has embedded special characters, where a select sequence of embedded characters is a clock compensation pattern. A look ahead circuit is used to detect the clock compensation pattern early and generate a clock compensation indicator signal. The FIFO writes data and the associated clock compensation indicator signal in a clock compensation indicator bit in synchronism with the recovered clock. A read circuit using a second clock of a different frequency than the first clock reads data and clock compensation bits from the FIFO and generates an almost empty signal when appropriate. A multiplexer is used at the FIFO output to pad data to the system interface. A clock compensation control circuit generates a selection signal based on an AND of the almost empty signal and the clock compensation indicator bit associated with a data element read out of the FIFO and using the selection signal to control the multiplexer selection signal.

6 Claims, 10 Drawing Sheets

| CLOCK | ALIGNED DATA B00-B19 | LOOK AHEAD DATA B00-B29 | K,R SPECIAL CHARACTER COMPARE | 8B10B OUTPUT | LOOK AHEAD | COMP BIT | WRITE FIFO DATA B | WRITE FIFO DATA A |
|---|---|---|---|---|---|---|---|---|
| T0 | /D2/,/D1/ | /K/,/D2/,/D1/ | K,Dx,Dx | | | | | |
| T0+1 | /R1/,/K/ | /R2/,/R1/,/K/ | R2,R1,K | D2, D1 | 0 | 0 | | |
| T0+2 | /R3/,/R2/ | /D3/,/R3/,/R2/ | Dx,R3,R2 | R1, K | 1 | 0 | D2 | D1 |
| T0+3 | /D4/,/D3/ | /D5/,/D4/,/D3/ | Dx,Dx,Dx | R3, R2 | 0 | 1 | R1 | K |
| T0+4 | /D6/,/D5/ | /D7/,/D6/,/D5/ | Dx,Dx,Dx | D4, D3 | 0 | 0 | D4 | D3 |
| T0+5 | /D8/,/D7/ | /D9/,/D8/,/D7/ | Dx,Dx,Dx | D6, D5 | 0 | 0 | D6 | D5 |
| T0+6 | /D10/,/D9/ | /D11/,/D10/,/D9/ | Dx,Dx,Dx | D8, D7 | | | | |

WRITE OF R3,R2 IS SKIPPED

ALMOST EMPTY WAS ALREADY ASSERTED BEFORE THE WRITE OF R3,R2 IS SKIPPED

FIG. 5B

| ACLK | ALMOST EMPTY | COMP 0 BIT | FIFO OUTPUT DATA B | FIFO OUTPUT DATA A | PAD OUTPUT | PADDING MPX DATA B | PADDING MPX DATA A |
|---|---|---|---|---|---|---|---|
| A0 | 1 | 0 | D2 | D1 | NO PAD | D2 | D1 |
| A0+1 | 1 | 1 | R1 | K | NO PAD | R1 | K |
| A0+2 | 1 | 0 | READ SKIPPED | | PAD | R | R |
| A0+3 | 0 | 0 | READ SKIPPED | | PAD | R | R |
| A0+4 | 0 | 0 | D4 | D3 | NO PAD | D4 | D3 |
| A0+5 | 0 | 0 | D6 | D5 | NO PAD | D6 | D5 |

| CLOCK | ALIGNED DATA B00-B19 | LOOK AHEAD DATA B00-B29 | K,R SPECIAL CHARACTER COMPARE | BB10B OUTPUT | LOOK AHEAD | COMP BIT | WRITE FIFO DATA B | WRITE FIFO DATA A |
|---|---|---|---|---|---|---|---|---|
| T0 | /D1/,/D0/ | /D2/,/D1/,/D0/ | Dx,Dx,Dx | | | | | |
| T0+1 | /K/,/D2/ | /R1/,/K/,/D2/ | R1,K,Dx | D1, D0 | 0 | 0 | D1 | D0 |
| T0+2 | /R2/,/R1/ | /R3/,/R2/,/R1/ | R3,R2,R1 | K, D2 | 1 | 0 | K | D2 |
| T0+3 | /D3/,/R3/ | /D4/,/R2/,/R1/ | Dx,Dx,Dx | R2, R1 | 0 | 1 | WRITE OF R2,R1 IS SKIPPED | |
| T0+4 | /D5/,/D4/ | /D6/,/D5/,/D4/ | Dx,Dx,Dx | D3, R3 | 0 | 0 | D3 | R3 |
| T0+5 | /D7/,/D6/ | /D8/,/D7/,/D6/ | Dx,Dx,Dx | D5, D4 | 0 | 0 | D5 | D4 |
| T0+6 | /D9/,/D8/ | /D10/,/D9/,/D8/ | Dx,Dx,Dx | D7, D6 | | | | |

| ACLK | ALMOST EMPTY | COMP 0 BIT | FIFO OUTPUT DATA B | FIFO OUTPUT DATA A | PAD OUTPUT | PADDING MPX DATA B | PADDING MPX DATA A |
|---|---|---|---|---|---|---|---|
| A0 | 0 | 0 | D1 | D0 | NO PAD | D1 | D0 |
| A0+1 | 0 | 1 | K | D2 | NO PAD | K | D2 |
| A0+2 | 0 | 0 | D3 | R3 | NO PAD | D3 | R3 |
| A0+3 | 0 | 0 | D5 | D4 | NO PAD | D5 | D4 |

FIG. 5E — 540

| CLOCK | ALIGNED DATA B00-B19 | LOOK AHEAD DATA B20-B29 | K,R SPECIAL CHARACTER COMPARE | 8B10B OUTPUT | LOOK AHEAD | COMP BIT | WRITE FIFO DATA B | WRITE FIFO DATA A |
|---|---|---|---|---|---|---|---|---|
| T0 | /D2/,/D1/ | /K/,/D2/,/D1/ | K,Dx,Dx | | | | | |
| T0+1 | /R1/,/K/ | /R2/,/R1/,/K/ | R2,R1,K | D2, D1 | 0 | 0 | D2 | D1 |
| T0+2 | /R3/,/R2/ | /D3/,/R3/,/R2/ | Dx,R3,R2 | R1, K | 1 | 1 | R1 | K |
| T0+3 | /D4/,/D3/ | /D5/,/D4/,/D3/ | Dx,Dx,Dx | R3, R2 | 0 | 0 | → WRITE OF R3,R2 IS SKIPPED | |
| T0+4 | /D6/,/D5/ | /D7/,/D6/,/D5/ | Dx,Dx,Dx | D4, D3 | 0 | 0 | D4 | D3 |
| T0+5 | /D8/,/D7/ | /D9/,/D8/,/D7/ | Dx,Dx,Dx | D6, D5 | | | D6 | D5 |
| T0+6 | /D10/,/D9/ | /D11/,/D10/,/D9/ | Dx,Dx,Dx | D8, D7 | | | | |

ALMOST EMPTY DID NOT GET ASSERTED BY SKIPPING THE WRITE OF R3,R2, SO NO READS ARE SKIPPED AND HAVING THE FIFO GO FULL IS AVOIDED

FIG. 5F — 550

| ACLK | ALMOST EMPTY | COMP 0 BIT | FIFO OUTPUT DATA B | FIFO OUTPUT DATA A | PAD OUTPUT | PADDING MPX DATA B | PADDING MPX DATA A |
|---|---|---|---|---|---|---|---|
| A0 | 0 | 0 | D2 | D1 | NO PAD | D2 | D1 |
| A0+1 | 0 | 1 | R1 | K | NO PAD | R1 | K |
| A0+2 | 0 | 0 | D4 | D3 | NO PAD | D4 | D3 |
| A0+3 | 0 | 0 | D6 | D5 | NO PAD | D6 | D5 |

FIG. 5G — 560

| CLOCK | ALIGNED DATA B00-B19 | LOOK AHEAD DATA B00-B29 | K,R SPECIAL CHARACTER COMPARE | 8B10B OUTPUT | LOOK AHEAD | COMP BIT | WRITE FIFO DATA B | WRITE FIFO DATA A |
|---|---|---|---|---|---|---|---|---|
| T0 | /D1/,/D0/ | /D2/,/D1/,/D0/ | Dx,Dx,Dx | | | | | |
| T0+1 | /K/,/D2/ | /R1/,/K/,/D2/ | R1,K,Dx | D1, D0 | 0 | 0 | D1 | D0 |
| T0+2 | /R2/,/R1/ | /R3/,/R2/,/R1/ | R3,R2,R1 | K, D2 | 1 | 1 | K | D2 |
| T0+3 | /D3/,/R3/ | /D4/,/D3/,/R3/ | Dx,Dx,R3 | R2, R1 | 0 | 1 | WRITE OF R2,R1 IS SKIPPED | |
| T0+4 | /D5/,/D4/ | /D6/,/D5/,/D4/ | Dx,Dx,Dx | D3, D4 | 0 | 0 | D3 | R3 |
| T0+5 | /D7/,/D6/ | /D8/,/D7/,/D6/ | Dx,Dx,Dx | D5, D4 | 0 | 0 | D5 | D4 |
| T0+6 | /D9/,/D8/ | /D10/,/D9/,/D8/ | Dx,Dx,Dx | D7, D6 | 0 | 0 | | |

FIG. 5H — 570

| ACLK | ALMOST EMPTY | COMP 0 BIT | FIFO OUTPUT DATA B | FIFO OUTPUT DATA A | PAD OUTPUT | PADDING MPX DATA B | PADDING MPX DATA A |
|---|---|---|---|---|---|---|---|
| A0 | 0 | 0 | | | NO PAD | | |
| A0+1 | 1 | 1 | D1 | D0 | NO PAD | D1 | D0 |
| A0+2 | 0 | 0 | K → READ SKIPPED | D2 | PAD | K | D2 |
| A0+3 | 0 | 0 | D3 | R3 | NO PAD | D3 | R3 |
| A0+4 | 0 | 0 | D5 | D4 | NO PAD | D5 | D4 |

FIG. 5I — 580

| CLOCK | ALIGNED DATA B00-B19 | LOOK AHEAD DATA B00-B29 | K,R SPECIAL CHARACTER COMPARE | 8B10B OUTPUT | LOOK AHEAD | COMP BIT | WRITE FIFO DATA B | WRITE FIFO DATA A |
|---|---|---|---|---|---|---|---|---|
| T0 | /D2/,D1/ | /K/,/D2/,/D1/ | K,Dx,Dx | | | | | |
| T0+1 | /R1/,/K/ | /R2/,/R1/,/K/ | R2,R1,K | D2, D1 | 0 | | | |
| T0+2 | /R3/,/R2/ | /D3/,/R3/,/R2/ | Dx,R3,R2 | R1, K | 1 | 0 | D2 | D1 |
| T0+3 | /D4/,/D3/ | /D5/,/D4/,/D3/ | Dx,Dx,Dx | R3, R2 | 0 | 1 → WRITE OF R3,R2 IS SKIPPED | R1 | K |
| T0+4 | /D6/,/D5/ | /D7/,/D6/,/D5/ | Dx,Dx,Dx | D4, D3 | 0 | 0 | D4 | D3 |
| T0+5 | /D8/,/D7/ | /D9/,/D8/,/D7/ | Dx,Dx,Dx | D6, D5 | 0 | 0 | D6 | D5 |
| T0+6 | /D10/,/D9/ | /D11/,/D10/,/D9/ | Dx,Dx,Dx | D8, D7 | 0 | 0 | | |

FIG. 5J — 590

| ACLK | ALMOST EMPTY | COMP 0 BIT | FIFO OUTPUT DATA B | FIFO OUTPUT DATA A | PAD OUTPUT | PADDING MPX DATA B | PADDING MPX DATA A |
|---|---|---|---|---|---|---|---|
| A0 | 0 | 0 | D2 | D1 | NO PAD | D2 | D1 |
| A0+1 | 1 | 1 → READ SKIPPED | R1 | K | NO PAD | R1 | K |
| A0+2 | 0 | 0 | | | PAD | R | R |
| A0+3 | 0 | 0 | D4 | D3 | NO PAD | D4 | D3 |
| A0+4 | 0 | 0 | D6 | D5 | NO PAD | D6 | D5 |

METHODS AND APPARATUS FOR INTERFACE BUFFER MANAGEMENT AND CLOCK COMPENSATION IN DATA TRANSFERS

CROSS-REFERENCE TO RELATED APPLICATIONS

This is a continuation of application Ser. No. 10/993,542, filed on Nov. 19, 2004 now U.S. Pat. No. 7,499,516 as the teachings of which are incorporated herein by reference.

FIELD OF INVENTION

The present invention relates generally to improved methods and apparatus for interface buffer management and clock compensation in data transfers across multiple data channels where a data channel operates at a clock rate different than an interfacing system's clock rate and more particularly to advantageous techniques for lane alignment and clock compensation in high performance serial data transfers.

BACKGROUND OF INVENTION

Serial interfaces are typically used to conserve packaging and cable space as compared to parallel interfaces. Even though serial interfaces provide reduced board space, cable, and connection costs, they must still meet a system's performance requirements. In addition to providing high performance, the serial interfaces must also provide error detection and correction capabilities and minimize bus arbitration latencies, a component affecting the serial interface performance.

One such high performance serial interface is a serial RapidIO® interface which is a packet switched interconnect technology. (RapidIO® is a registered trademark of the RapidIO Trade Association.) The serial RapidIO® interface is an interconnect standard that allows a single lane (1×) or four lanes (4×) of serial data transfers, with each lane working at a multi-gigabit/second data rate. With the serial RapidIO® interface configured for four lanes, eight to ten cycles are typically needed to do lane alignment and clock compensation. The serial lanes are aligned to compensate for different serial interconnect delays going through the four serial lanes. Asynchronous first in first out memories (FIFOs) are use in the lane alignment process. Clock compensation is also used to compensate for clock frequency differences between two agents connected through a serial RapidIO® interconnect. A second asynchronous FIFO, working as an elastic buffer, is generally used for clock compensation. The reason for the eight to ten cycles of lane alignment latency is that lane alignment and clock compensation operations are done in two stages, with four to five cycles of latency in each stage. Consequently, there is a need to improve the lane alignment latency to improve the overall serial interface and system performance.

SUMMARY OF INVENTION

Among its several aspects, the present invention addresses an apparatus and method for management of a first in first out (FIFO) buffer and clock compensation of data transfers. A look ahead circuit is used for detecting a clock compensation pattern, and for generating a clock compensation indicator signal upon detecting the clock compensation pattern. The FIFO buffer with a data input and a data output is used to store a plurality of accessible data elements where each data element has an associated clock compensation indicator bit.

A more complete understanding of the present invention, as well as other features and advantages of the invention, will be apparent from the following detailed description and the accompanying drawings.

DETAILED DESCRIPTION

The present invention will now be described more fully with reference to the accompanying drawings, in which several presently preferred embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

A RapidIO® transmitter, acting as a common source, in a 4× mode of operation generates four encoded serial data streams for transmission to a destination receiver. Each of the four serial data streams is encoded using an 8B10B encoder which has sufficient bit transition density to allow a clock to be recovered at the receiver. Each 8B10B encoder receives 9-bit characters where each 9-bit character consists of a data byte, 8-bits, and a control bit, and each 9-bit character is identified by a letter number combination, for example D2. The 8B10B encoder encodes the 9-bit character into a 10-bit encoded code group identified by the letter number combination enclosed by forward slashes, for example /D2/. The control bit in each 9-bit character if a "0" indicates the data byte is data and if the control bit is a "1" then the data byte is a special control character. Data transferred on the four serial links is arranged as stripes of data beginning with a control sequence for each serial lane. After the control sequence, the data transfer sequence begins with a first stripe, for example, with lane 0 transferring data-0, /D0/, lane 1 transferring data-1, /D1/, lane 2 transferring data-2, /D2/, and lane 3 transferring data-3, /D3/, in parallel and at the same clock frequency rate. The next character sequence has a second data stripe with lane 0 transferring data-4, /D4/, lane 1 transferring data-5, /D5/, lane 2 transferring data-6, /D6/, and lane 3 transferring data-7, /D7/. The RapidIO® transmitter may also operate in a 1× mode of operation for a single serial data channel.

The serial RapidIO® interface standard allows for up to 200 ppm frequency difference between a transmitting device and a receiving device as discussed further below. The standard supports three data rates of 1.25 gigabits per second (GBPS), 2.5 GBPS, and 3.125 GBPS. Due to variations in clock frequencies, such as the recovered clock having a higher frequency than the receiver's application clock, the transfer of data across the clock boundary through FIFOs could experience overflow problems and lose data. Consequently, a clock compensation pattern is typically sent at regular intervals in a data transmission sequence. With 200 ppm frequency difference or a variation of 1 cycle/5,000 cycles, a clock compensation sequence is typically sent every 5,000 characters. The clock compensation pattern is a sequence of control characters consisting of a sync character K followed by three skip characters R, in other words a sequence of K,R,R,R. This sequence of characters is sent in each lane and detected in the clock compensation logic. The clock compensation sequence of characters allows a lane FIFO a chance to catch up to avoid overflow problems that might otherwise occur. The clock compensation logic needs to remove the R characters from the clock compensation pattern, or add R characters after it, when the elastic buffer is going full or empty, respectively.

Conventionally, in the 4× mode of operation, two stages of first in first out buffers (FIFOs) are needed to do lane alignment and clock compensation. A first stage is used for lane alignment by using a FIFO in each lane to support the lane alignment process. If the lanes are misaligned, the FIFO in each lane operates at a different level of data marking. So, at any point of time, a different amount of data may reside in each FIFO in each lane. Conventionally, the lane FIFOs have the write and read clocks running at exactly the same frequency using the recovered clocks from the lanes. Lane alignment places the data in correct sequential relationship between the lanes. Once the lane alignment is accomplished, the water mark or data relationship in each FIFO is set and it remains in synchronism for the rest of the serial transfer operation without any chance of overfilling or underfilling the FIFOs.

A second stage is used for clock compensation. Conventionally, in the second stage, the lane aligned data from each lane is assembled together in a single clock compensation FIFO. The clock compensation FIFO write and read clocks are typically running at different frequencies. Depending on the frequency difference between the write and read clocks, the clock compensation FIFO has a tendency to either fill or go empty.

Among its several aspects, the present invention advantageously merges the first stage for lane alignment with the second stage for clock compensation. A single FIFO is used in each lane. FIFO write operations in each lane are in synchronism with a recovered clock from the lane serial data stream. FIFO read operations in each lane are in synchronism with a system application clock from a system interface. Consequently, in the 4× mode of operation, there are four recovered clocks and a single system application clock. At any point in time, the single FIFO in each lane will either be approaching a full or an empty state depending upon the read and write clock frequencies. In order to keep the lane alignment secure when a clock compensation pattern is received in any lane, the same type of compensation is applied to the FIFOs in the other lanes, even though they many not immediately require clock compensation. In other words, after lane alignment is completed, though only one lane FIFO out of the four lane FIFOs may be going empty or full, all four FIFOs receive the same type of compensation.

Figure 1:
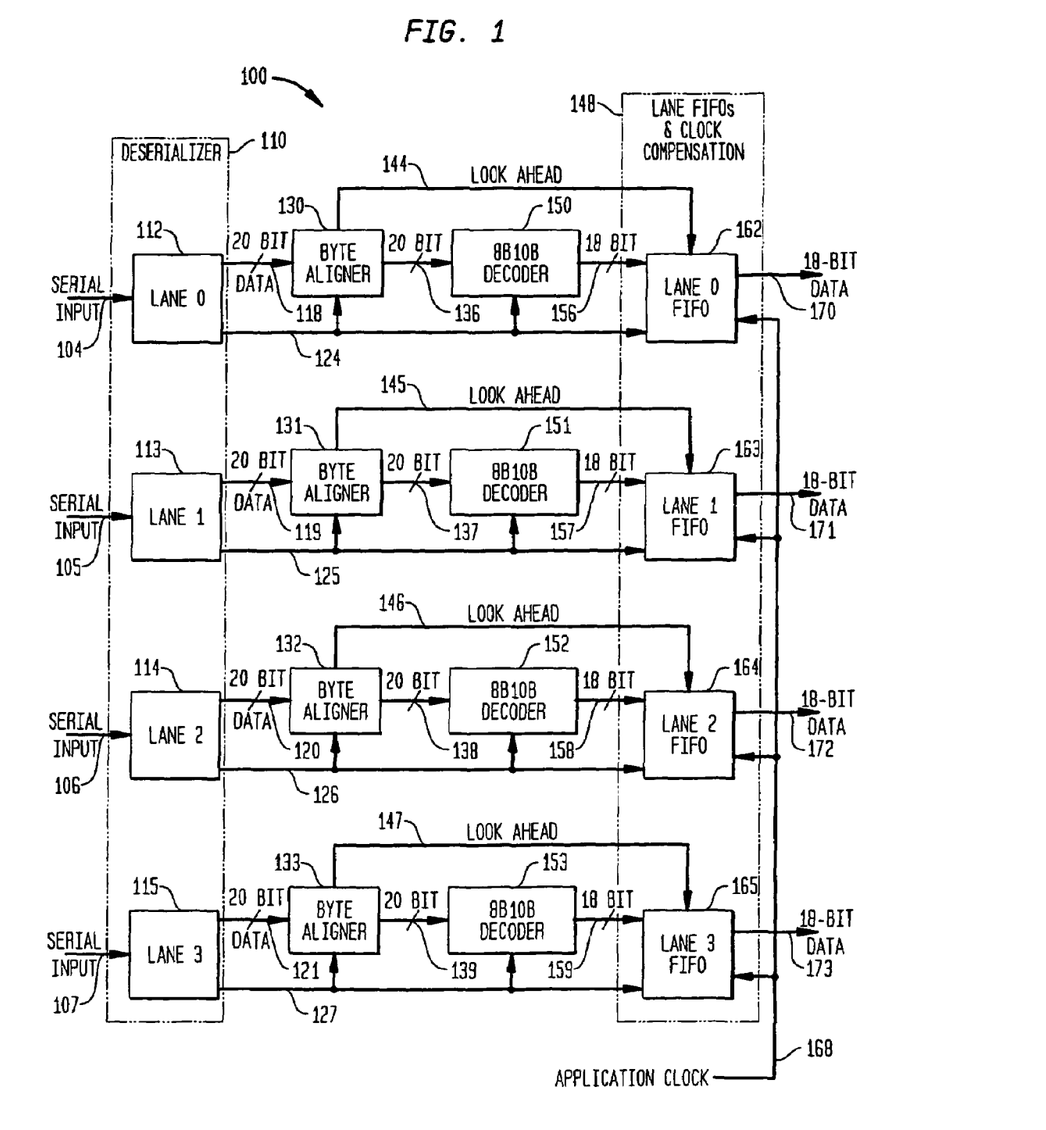
FIG. 1 illustrates a serial receive data path circuit with four to five clock cycle latency for lane alignment and clock compensation in accordance with the present invention.

FIG. 1 illustrates a serial receive data path circuit 100, such as for a RapidIO® interface, with four to five clock cycle latency for lane alignment and clock compensation for four input serial data streams 104-107, originating from a common source for the four serial data streams. The serial data streams 104-107 are connected to a deserializer block 110. The deserializer block 110 has a lane circuit 112-115 for deserialization and clock recovery in each lane. Each lane circuit 112-115 changes 20-bits of serial data to 20-bits of parallel data which are output on outputs 118-121, respectively. The serial data streams 104-107 contain an embedded transmission clock which each lane circuit 112-115, recovers generating a recovered clock on outputs 124-127, respectively. The four recovered clock outputs 124-127 have absolutely no phase correspondence to each other, though they have the same frequency as they come from the same source.

The 20-bits of parallel data on outputs 118-121 are connected to byte aligner circuits 130-133, respectively. Each byte aligner searches in the data stream for a special 7-bit control character, referred to as a comma, to determine code group boundaries. Once a comma has been detected, byte aligned data consisting of two 10-bit code-groups is generated on outputs 136-139. The byte aligners also advantageously generate look ahead code groups on outputs 144-147 consisting of three 10-bit code groups to be used in the lane alignment and clock compensation circuit 148.

The byte aligned data for each lane on outputs 136-139 of byte aligners 130-133 is decoded by a corresponding 8B10B decoder 150-153, respectively. The decoders 150-153 generate two 9-bit characters for each lane on outputs 156-159, where each 9-bit character consists of a data byte and a control bit. The 8B10B decoders 150-153 use an incoming 10-bit code group to lookup in a stored table its associated 9-bit character.

The four sets of 18-bits at outputs 156-159, comprise two 9-bit characters associated with each lane, and are written to lane FIFOs 162-165 using each lane's recovered clock output 124-127, respectively. The data characters written to the lane FIFOs are organized in stripes with data-0 and data-4 being written to lane 0 FIFO 162, data-1 and data-5 written to lane 1 FIFO 163, data-2 and data-6 written to lane 2 FIFO 164, and data-3 and data-7 being written to lane 3 FIFO 165.

Prior to writing data to a FIFO or reading data from a FIFO, the state of the FIFO, represented by full, almost full, empty, or almost empty signals, must be determined. The operations of reading or writing to a FIFO typically require two cycles to determine the status of the full, almost full, empty, or almost empty signals. An almost full signal occurs when there is only room for one more data entry in the FIFO. An almost empty signal occurs when there is only one data item in the FIFO that can be read. For a write followed by a read, typically, a total of 4 clock cycles are required. If there are decisions to be made prior to reading or writing the FIFO, then an additional cycle may be required.

As noted above, the serial RapidIO® interface standard allows for up to 200 ppm frequency difference between connecting devices and the standard supports three data rates of 1.25 giga bits per second (GBPS), 2.5 GBPS, and 3.125 GBPS. Since the deserializers in each lane circuit 112-115 convert each lane's serial data stream into a 20-bit data parallel stream, the recovered clocks operate at the above frequencies divided by 20 or 62.5 MHz, 125 MHz, and 156.25 MHz and plus or minus 100 ppm. A clock compensation pattern K,R,R,R is typically sent at regular intervals in a data transmission sequence. This K,R,R,R sequence of characters is sent in each lane and detected in the clock compensation logic. The clock compensation logic removes R characters from the clock compensation pattern, or adds R characters after it, when a lane FIFO is going full or empty, respectively.

Figure 3:
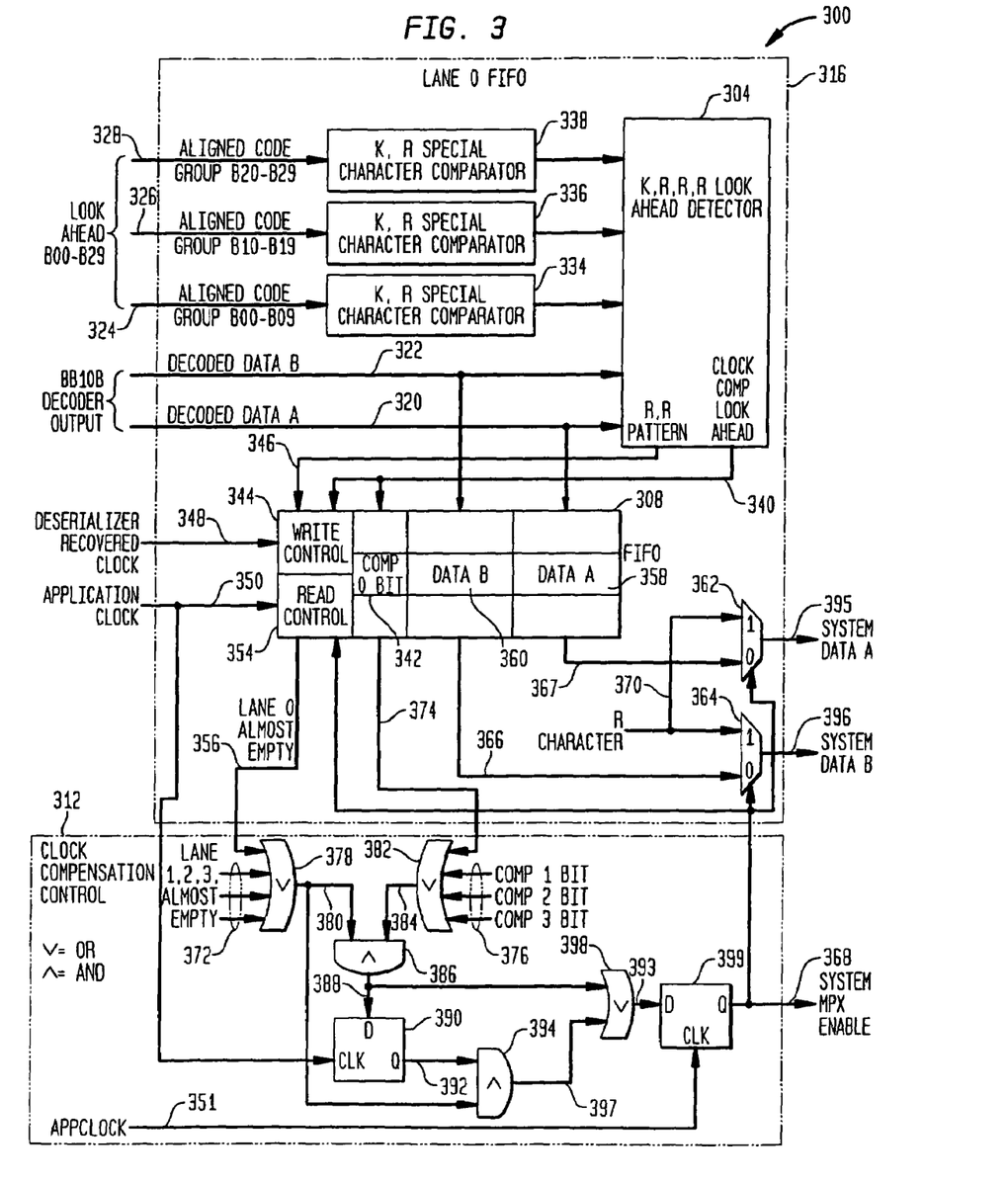
FIG. 3 illustrates lane 0 FIFO and clock compensation logic with a clock compensation sequence (K,R,R,R) look ahead detector, the lane 0 FIFO, and clock compensation control with clock compensation being based on 20-bits of aligned serial data and 30-bits of aligned look ahead data in accordance with the present invention.

Each recovered clock output 124-127 is further used to write the four lanes of data on outputs 156-159 of the 8B10B decoders 150-153 to the lane FIFOs 162-165, respectively. To transfer this data from the recovered clock domain into the system application clock domain where the application clock may be of a different phase and different frequency than a recovered clock, each lane FIFO operates with both the system application clock and the lane's recovered clock. Lane FIFO write operations are in synchronism with the recovered clock and lane FIFO read operations are in synchronism with the application clock. Due to the variations in the two clocks, clock compensation logic is used. Each lane FIFO acts as an elastic buffer due to the different timing of the write and read operations and requires four to five cycles of latency due to the asynchronous clocks for writing and reading aligned data. Clock compensation is used to manage the operations of the lane FIFOs 162-165 to preclude overrun full conditions and no data empty conditions. The four to five cycles of latency is a significant improvement over prior systems that required eight to ten cycles of latency to write and read lane aligned data and provide clock compensation. In the advantageous approach of the present invention, the clock compensation function is embedded with the lane alignment function such that a single FIFO is used in each lane and a separate clock compensation FIFO is not required. Additional details of lane FIFO logic in accordance with the present invention are shown in FIG. 3 and discussed in detail below. Additionally, lane FIFO logic is used to write and read lane aligned data and allows an advantageous control method also described in further detail below.

Figure 2:
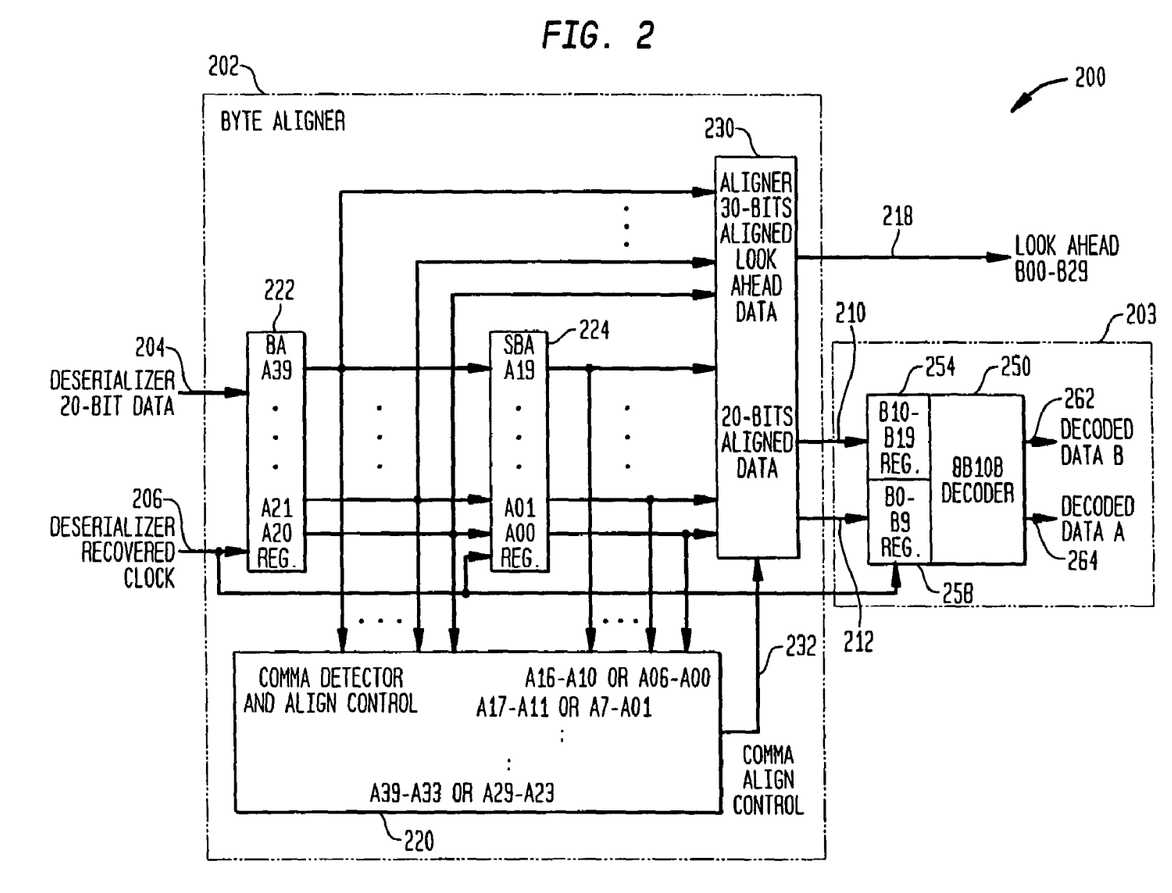
FIG. 2 illustrates a byte aligner and an 8B10B decoder circuit that generates aligned code group data and aligned look ahead data for providing advance notice of clock compensation patterns, the 8B10B decoder operating to decode the aligned code group data in accordance with the present invention.

FIG. 2 illustrates a circuit 200 comprising an exemplary byte aligner 202 and an 8B10B decoder circuit 203. The byte aligner 202 is suitable for use as each of the byte aligners of 130-133 of FIG. 1 and the 8B10B decoder 203 is suitable for use as each of the 8B10B decoders 150-153 of FIG. 1. The byte aligner 202 generates aligned code group data and aligned look ahead data for providing advance notice of clock compensation patterns and the 8B10B decoder 203 decodes the aligned code group data. The byte aligner 202 receives two 10-bit code groups from the deserializer as 20-bit data 204 and a deserializer recovered clock 206. The byte aligner 202 generates 20-bits of aligned data as a first 10-bit code group B10-B19 210 and a second 10-bit code group B0-B9 212. The byte aligner 202 also generates 30-bits of aligned look ahead data B00-B29 218 for providing advance notice of clock compensation patterns. In the byte aligner 202, a comma detector and align control 220 is used to check the incoming deserialized 20-bit data 204 for the 7-bit comma character. The comma character is either 0011111 or 1100000 based on the disparity of the 8B10B encoder. The RapidIO™ Interconnect Specification Part VI: Physical Layer 1xz/4x LP-Serial Specification, Rev. 1.2, June/2002 standard can be consulted for further description of the serial interface and the concept of disparity, and is incorporated by reference herein in its entirety.

Every recovered clock cycle, 20-bits of data are received in the byte aligner in register 222. When the next 20-bits of data are received, the contents of register 222 are transferred to register 224. With this arrangement, 40-bits of unaligned data, A00-A39, can be searched for the 7-bit comma character. Since the deserialized data is unaligned, every 7-bit sequence of bits within the 40-bits is compared to the 7-bit comma character. Because there may be misalignment, the comma character may be split across two 20-bit code groups, in other words, across registers 222 and 224. Once a comma has been detected, the 10-bit code-groups following the comma character are aligned in aligner 230 based on comma align control signals 232. The aligner 230 produces 20-bits of aligned serial data in two 10-bit code groups B10-B19 210 and B0-B9 212. The aligner 230 also produces 30-bits of aligned look ahead data B00-B29 218. Referring to FIG. 1, the byte aligners 130-133 generate 30-bits of aligned look ahead data on their outputs 144-147 consisting of three 10-bit characters to be used in the lane aligner and clock compensation logic 148.

The two 10-bit code groups B10-B19 210 and B0-B9 212 are received in the 8B10B decoder 250 and latched in registers 254 and 258, respectively. Note that depending upon circuit timing, the registers 254 and 258 may not be required. The 8B10B decoder 250 uses two table lookup functions internally to separately decode each received code group into data characters. The 8B10B decoder 250 outputs the decoded data characters on decoded data B output 262 and decoded data A output 264.

FIG. 3 illustrates an exemplary lane 0 FIFO and clock compensation logic 300, logic 300 includes a clock compensation sequence K,R,R,R look ahead detector 304, a lane 0 FIFO 308, and a clock compensation control circuit 312. The clock compensation is based on the 20-bits of aligned serial data and the 30-bits of aligned look ahead data. Four lane FIFOs and clock compensation logic 148 are illustrated in FIG. 1. Further details of a lane 0 FIFO 316 suitable for use as lane 0 FIFO 162 are shown in FIG. 3. Similar circuitry may be employed for the lane 1 FIFO 163, lane 2 FIFO 164 and lane 3 FIFO 165, respectively. The clock compensation control 312 is suitable for supporting all four lane FIFOs 162-165 and is described in further detail below.

Lane 0 FIFO 316 contains the look ahead detector 304 which checks the incoming aligned and decoded data A 320 and decoded data B 322 from the 8B10B decoder 250, and the look ahead data 324, 326, and 328 for the K,R,R,R character sequence. The look ahead data from the byte aligner 200 B00-B29 218 is checked for the K and R characters in three code groups, aligned code group B00-B09 324, aligned code group B10-B19 326, and aligned code group B20-B29 328. The three code groups 324, 326, and 328 are each separately compared in special character comparators 334, 336, and 338, respectively, for the special characters K and R that are part of the clock compensation pattern K,R,R,R. Other special characters may be compared as may be required for other operational control.

When the K,R,R,R look ahead detector 304 detects a K,R,R,R pattern, a clock compensation look ahead signal 340 is set to an active state of 1 to be written into a comp 0 bit 342 in the FIFO 308. The clock compensation look ahead signal 340 may also be used in the write control 344, for example, when an R,R pattern is detected from the decoded data A 320 and decoded data B 322, an R,R pattern signal 346 is set to an active state indicating the write of the R,R pattern from the K,R,R,R clock compensation pattern should skipped and not written into the FIFO 308. When the decoded data A 320, decoded data B 322, and the comp 0 bit are to be written into the FIFO, the write operation occurs in synchronism with the deserializer recovered clock 348.

Reading the lane 0 FIFO occurs in synchronism with the application clock 350. Read control 354 monitors the almost empty, empty, almost full, and full state of the FIFO 308 and for the purposes of reading data from the FIFO, a lane 0 almost empty signal 356 may be generated. The lane 0 almost empty signal 356 is generated in synchronism with a read operation, as may occur, for example, when a read operation occurs after skipping a write to the FIFO due to a clock compensation pattern being received. Whenever any lane FIFO logic determines an almost empty condition, the FIFO output data is padded to allow the FIFO or FIFOs to catch up with data writes to the FIFO. When the lanes' FIFOs are not in an almost empty state, FIFO data A 358 and data B 360 are normally read through padding multiplexers 362 and 364, respectively, with a 0 system mpx enable signal 368. Padding is the act of placing in the data path the R special character 370, with a 1 system mpx enable signal 368, without reading data from a FIFO.

To determine when padding is to be done or not, the clock compensation control 312 uses lane 0 almost empty signal 356 and lane 1, 2, 3, almost empty signals 372 from each lane's FIFO logic and previously stored comp bits 374 and 376 from each lane. The logical OR of the lane 0 almost empty signal 356 and lane 1, 2, and 3 almost empty signals 372 in OR gate 378 generates a system almost empty signal 380. The logical OR of the comp 0 bit 374 and comp 1, 2, and 3 bits 376 in OR gate 382 generates a system comp signal 384. The logical AND of the system almost empty signal 380 and system comp signal 384 in AND gate 386 generates pad signal 388. The pad signal 388 is latched in latch 390 creating a delayed pad signal 392. A logical AND 394 of the delayed pad signal 392 and the system almost empty signal 380 generates a system pad signal 397. A logical OR of the pad signal 388 and the system pad signal 397 in OR gate 398 generates an early mpx enable signal 393. The early mpx enable signal 393 is delayed by a clock cycle using appclock 351 and latch 399 that outputs the system mpx enable signal 368. The read control circuit 354 is made aware of a pad operation occurring by the feedback of the system mpx enable signal 368. The system mpx enable signal 368 is used to control the padding multiplexers in the other lane FIFOs.

Figure 4A:
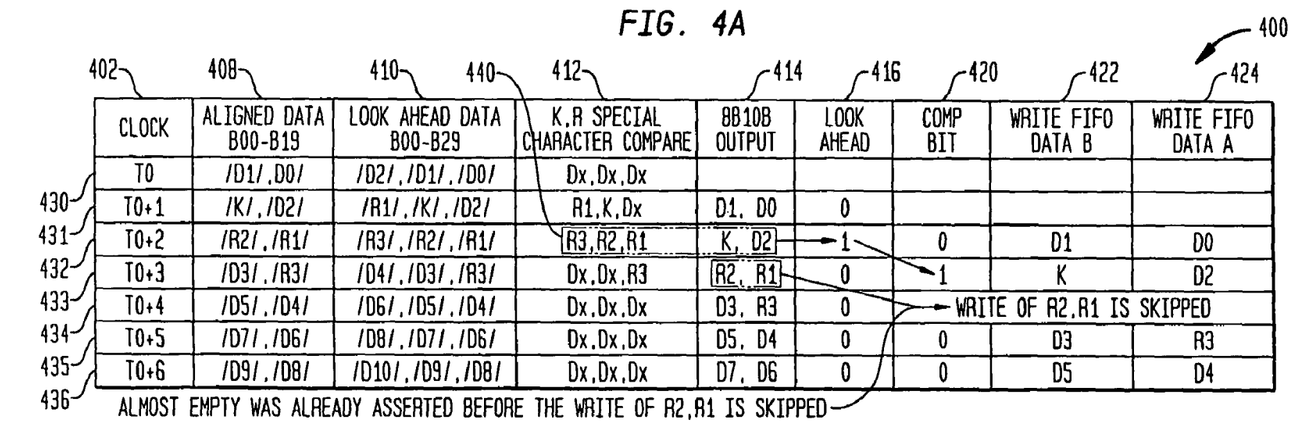
FIG. 4A illustrates a FIFO input character sequence for writing data into a lane FIFO when the application clock is faster than the recovered serial clock and the FIFO reaches an almost empty condition in accordance with the present invention.

FIG. 4A illustrates a FIFO input character sequence 400 for writing data into a lane FIFO when the application clock 350 is faster than the deserializer recovered clock 348 and the FIFO reaches an almost empty condition before skipping a write operation, where the skipping of the write operation is due to a received clock compensation pattern. Clock cycles 402 are recovered serial clock cycles beginning at a first cycle T0. All data and parameter columns 408, 410, 412, 414, 416, 420, 422, and 424 contain data and signals that are valid during the indicated row clock cycles. The clock cycles T0, T0+1, . . . , T0+6 are labeled 430-436, respectively. A particular cell of the FIFO input character sequence 400 is referenced by identifying a particular row and column using a {row, column} notation. An exemplary data sequence, comma, D0,D1,D2,K,R1,R2,R3,D3,D4, . . . , D10, is used to discuss the flow of data through the various stages of the serial receive data path circuit 100 for lane 0. The lane 0 FIFO and clock compensation logic 300 are discussed to illustrate writing and reading lane aligned data and supporting clock compensation for lane 0 and the other lanes. It is also noted that circuit gate delays, register delays, and FIFO delays are not generally discussed, as they may vary depending upon the process technology. Also, for clarity of illustration of the logical operation, the additional cycles a FIFO takes to determine the status of the full, almost full, almost empty, or empty signals are not shown.

The exemplary data sequence is started after the data sequence has been byte aligned. In cycle T0 430, the aligner 230 of FIG. 2 generates byte aligned data B00-B19/D1/, /D0/ {430, 408} and look ahead data B00-B29/D2/, /D1/, /D0/ {430, 410}. Also, during clock cycle 430, the K, R special character comparators 338, 336, and 334 of FIG. 3 output Dx, Dx, Dx, respectively, {430, 412} indicating three data characters were received.

In the next clock cycle T0+1 431, the aligner 230 generates byte aligned data B00-B19/K/, /D2/{431, 408} and look ahead data B00-B29/R1/, /K/, /D2/ {431, 410}. The K, R special character comparators output R1, K, Dx {431, 412} and the 8B10B decoder 250 of FIG. 2 outputs D1, D0 {431, 414}. The K,R,R,R look ahead detector 304 does not detect any clock compensation pattern and the clock compensation look ahead signal is 0 {431, 416}. Also, the FIFO read control logic 354 of FIG. 3 has not asserted the lane 0 almost empty signal 356.

In clock cycle T0+2 432, the character sequence continues with clock cycle T0+2 row 432 of character sequence 400 shown in Table 1 below for ease of reference and discussion:

TABLE 1

Clock Cycle T0 + 2 row 432 of Character Sequence 400

| Data and Parameters | Circuit | Reference |
|---|---|---|
| /R2/, /R1/ | Byte aligned data 212, 210 | {432, 408} |
| /R3/, /R2/, /R1/ | Look ahead data 328, 326, 324 | {432, 410} |
| R3, R2, R1 | K, R Comparators 338, 336, 334 | {432, 412} |
| K, D2 | 8B10B decoder output 322, 320 | {432, 414} |
| 1 | clock compensation look ahead signal 340 | {432, 416} |
| 0 | Write FIFO clock comp look ahead 340 | {432, 420} |
| D1 | Write FIFO Data B 360 | {432, 422} |
| D0 | Write FIFO Data A 358 | {432, 424} |

The K,R,R,R look ahead detector 304 of FIG. 3 detected the clock compensation K,R,R,R pattern 440 which causes the lane 0 clock compensation look ahead signal 340 to go to a 1 state {432, 416}. In the previous T0+1 cycle {431, 416}, the clock compensation look ahead signal 340 was a 0 value. The clock compensation look ahead signal 0 value is written into the FIFO in the comp 0 bit location 342 {432, 420} and the FIFO locations D1 360 and D0 358 are also written in the FIFO in cycle 432. The lane 0 almost empty signal remains a 0.

In cycle T0+3 433, the character sequence continues with the advantageous writing of the clock compensation look ahead signal 340 into the comp 0 bit 342 {433, 420}. In cycle T0+4 434, the character sequence continues and due to receiving a clock compensation pattern, the R2,R1 portion of the clock compensation pattern is not written into the FIFO. This skipping of writing is shown in row 434 columns 420, 422, and 424 by the notation that the write of R2, R1 is skipped. The writing of the two R characters from the clock compensation pattern is always skipped due to anticipating that the FIFO may be approaching a full state. It is further noted that while the FIFO input character sequence 400 for writing data is ongoing, read operations are also occurring to read data from the FIFO for application use. The read operations and the almost empty signal are in synchronism with the application clock and may occur asynchronously with respect to the recovered serial clocks. The skipping of writing two R characters may result in the almost empty signal being generated. The almost empty signal may also be generated due to the application clock being faster than the recovered serial clock, with reads from the FIFO tending to occur faster than writes to the FIFO. For purposes of illustration, the lane 0 almost empty is set to a 1 sometime during cycle T0+3 433 based on a FIFO read operation.

Figure 4B:
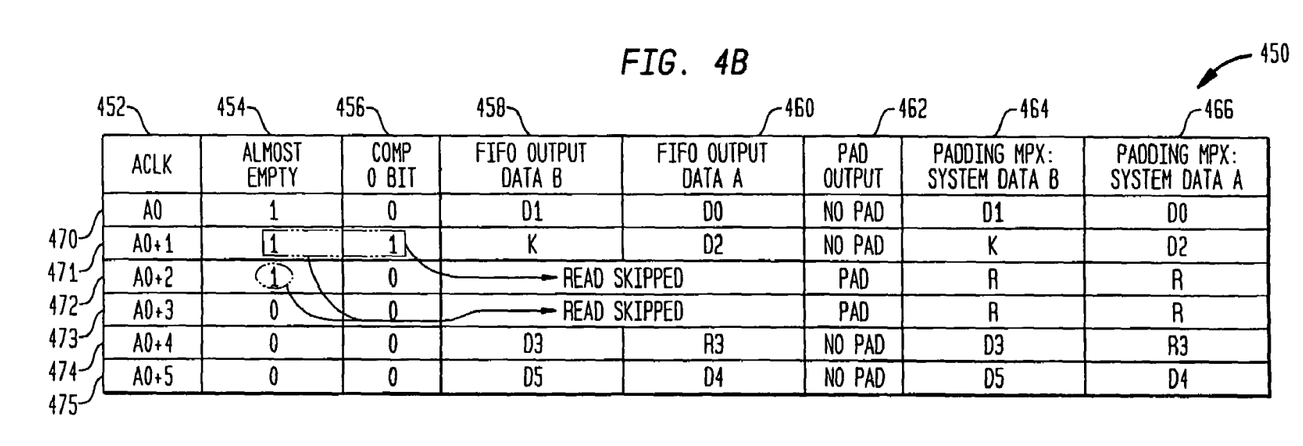
FIG. 4B illustrates a FIFO output character sequence for reading data from a lane FIFO when the application clock is faster than the recovered serial clock and the FIFO reaches an almost empty condition in accordance with the present invention.

FIG. 4B illustrates a FIFO output character sequence 450 for reading data from a lane FIFO when the application clock is faster than the recovered serial clock and the FIFO reaches an almost empty condition. Clock cycles 452 are application serial clock cycles beginning at a first cycle A0. All data and parameter columns 454, 456, 458, 460, 462, 464, and 466 contain data and signals that are valid during the indicated row clock cycles. The clock cycles A0, A0+1, ..., A0+5 are labeled 470-475, respectively. A particular cell of the FIFO input character sequence is referenced by identifying a particular row and column using a {row, column} notation.

In cycle A0 470, almost empty is a 1 {470, 454} and comp 0 bit {470, 456} is a 0 due to a FIFO read operation. The data D1 {470, 458} and D0 {470, 460} are read out of the FIFO 308 of FIG. 3 on FIFO outputs 366 and 367, respectively. No padding {470, 462} is required so the system mpx enable signal 368 is 0. This can be seen in FIG. 3, with lane 0 almost empty 356 a 1 and lane 1, 2, and 3 almost empty signals 372, for the purposes of illustration, are 0, the OR gate 378 system almost empty output signal 380 is a 1. With comp 0 bit 374 a 0 and comp 1, 2, and 3 bits 376 also 0, the system comp output signal 384 is a 0. The AND of the system almost empty signal 380 and the system comp signal 384 generates a pad signal 388 that is 0. The latch 390 stores the pad signal and outputs a delayed pad signal 392 that is a 0. The AND gate 394 has two 0 inputs and produces a system pad signal 397 of 0. A logical OR of the pad signal 388 being a 0 and the system pad signal 397 being a 0 in OR gate 398 generates an early mpx enable signal 393 that is also a 0. The early mpx enable signal 393 is delayed by a clock cycle using appclock 351 and latch 399 outputs a 0 on the system mpx enable signal 368. Therefore, the padding multiplexers 362 and 364 pass the FIFO output data through to the system as system data A 395 and system data B 396.

In cycle A0+1 471, the almost empty signal {471, 454} is a 1 and comp 0 bit {471, 456} is a 1. The data K {471, 458} and D2 {471, 460} is read out of the FIFO on FIFO outputs 366 and 367, respectively. No padding {471, 462} is required this cycle so the system mpx enable signal 368 is 0. This can be seen in FIG. 3, with lane 0 almost empty 356 a 1 and lane 1, 2, and 3 almost empty signals 372 also 0, the OR gate 378 system almost empty signal 380 is a 1. With comp 0 bit 374 a 1 and comp 1, 2, and 3 bits 376 being some combination of 0s or 1s, the OR gate 382 system comp signal 384 is a 1. The AND 386 of the system almost empty signal 380 being a 1 and the system comp signal 384 being a 1 generates a pad signal 388 that is a 1. The OR gate 398 outputs the early mpx enable signal 393 as a 1 and on the next cycle 472, the latch 399 will output a 1 on the system mpx enable signal 368. Also, on the next cycle 472, the latch 390 will store the pad signal 388 and output a 1 on delayed pad signal 392. On the present cycle 471, the latch 399 output system mpx enable signal 368 is a 0. Therefore, for the present cycle 471, the padding multiplexers 362 and 364 pass the FIFO output data through to the system as system data A 395 and system data B 396.

In cycle A0+2 472, the almost empty signal {472, 454} is still a 1 and the comp 0 bit is a 0 {472, 456}. The read operation is skipped and the system data A output 395 and data B output 396 are padded, requiring the system mpx enable signal 368 to be a 1. This can be seen in FIG. 3, where the OR gate 398 outputs the early mpx enable signal 393 as a 1 from the previous cycle and on this cycle 472, the 1 is clocked into the latch 399. The latch 399 outputs a 1 on the system mpx enable signal 368. Therefore, the padding multiplexers 362 and 364 pass an R character 370 through to the system data A 395 and system data B 396. On this cycle 472, the latch 390 clocks in a 1 and with almost empty being a 1, the AND gate 394 output system pad signal 397 is a 1. The OR gate 398 input pad signal 388 goes to a 0 but the OR gate 398 other input system pad signal 397 is a 1, such that the latch 399 will clock a 1 into the latch on the next cycle T0+3 473.

In the next cycle T0+3 473, the read operation is skipped and the system output is padded for a second time due to the previous cycle still having an almost empty condition. Since almost empty {473, 454} is a 0 and the comp bits are 0, AND gate 386 outputs pad signal 388 as a 0. Both inputs to the OR gate 398 are 0 so the next cycle latch 399 will output a 0, returning the multiplexers 362 and 364 back to selecting the FIFO data output when the FIFO is read.

Figure 5A:
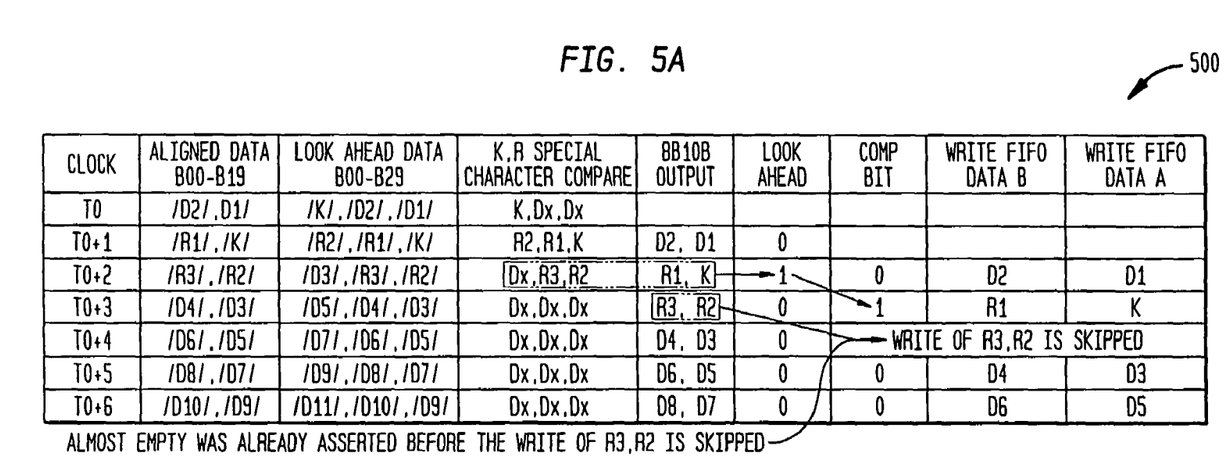
FIGS. 5A-5J illustrate FIFO input and output character sequences for other variations in data sequences and in the application clock and recovered clock in accordance with the present invention.
Figure 5B:
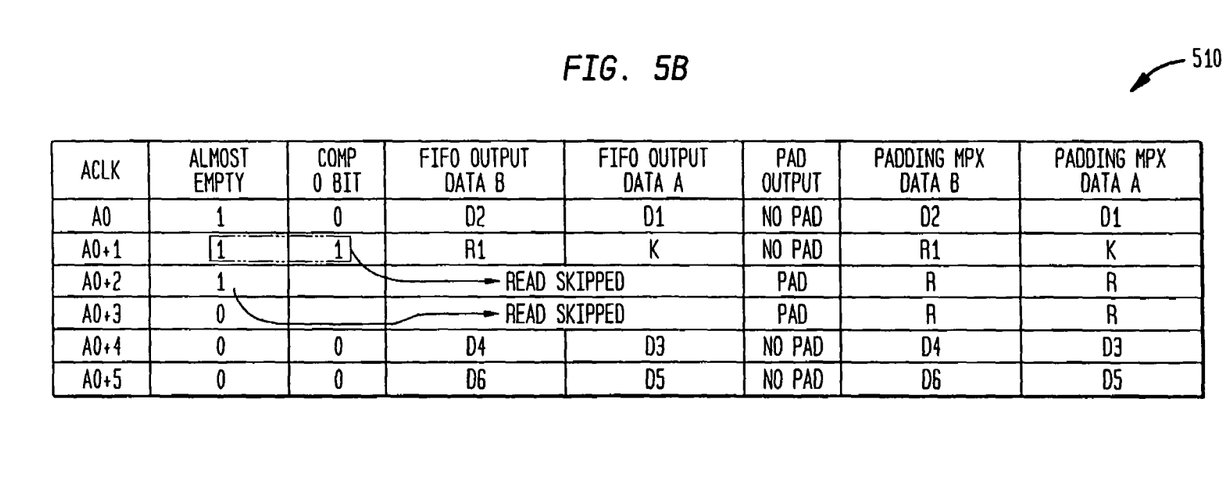
Figure 5C:
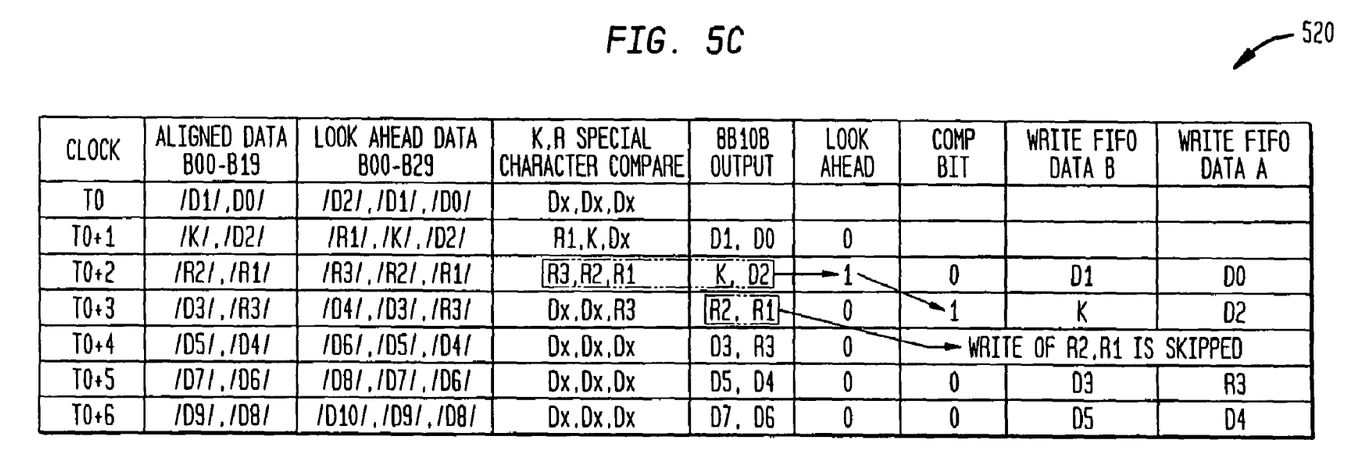
Figure 5D:
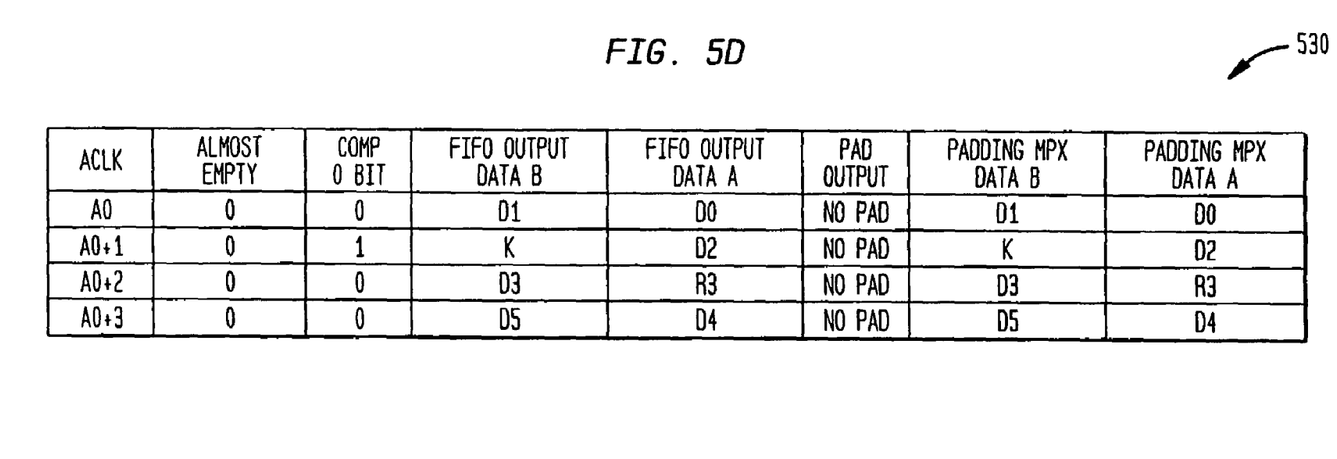
Figure 5E:
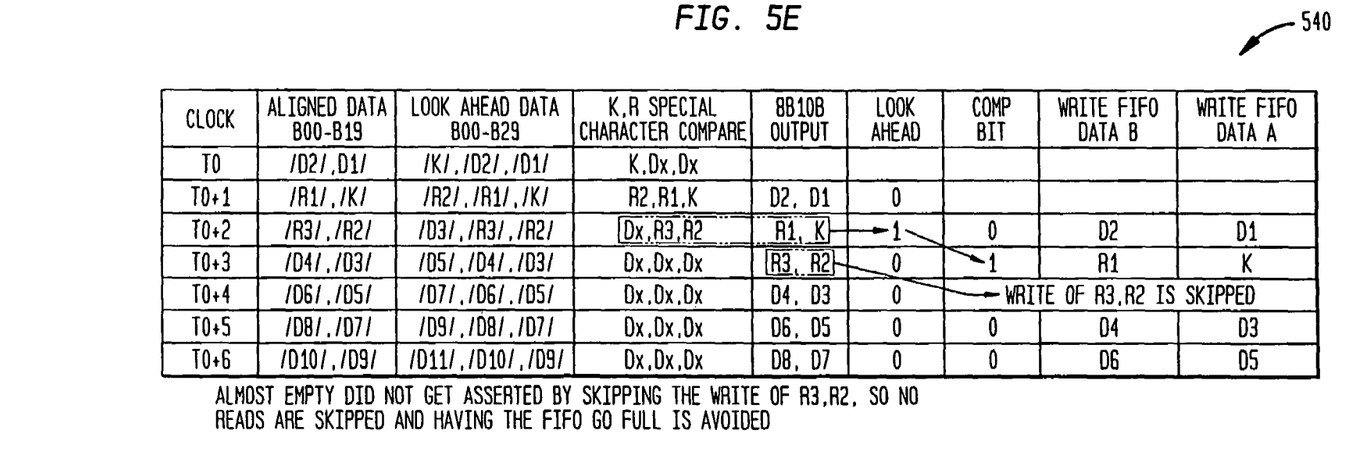
Figure 5F:
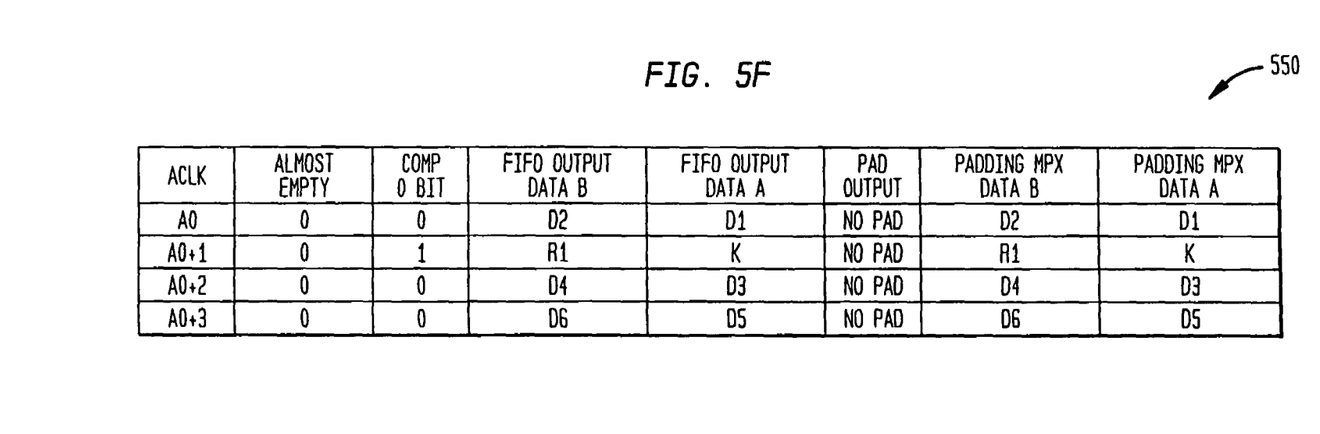
Figure 5G:
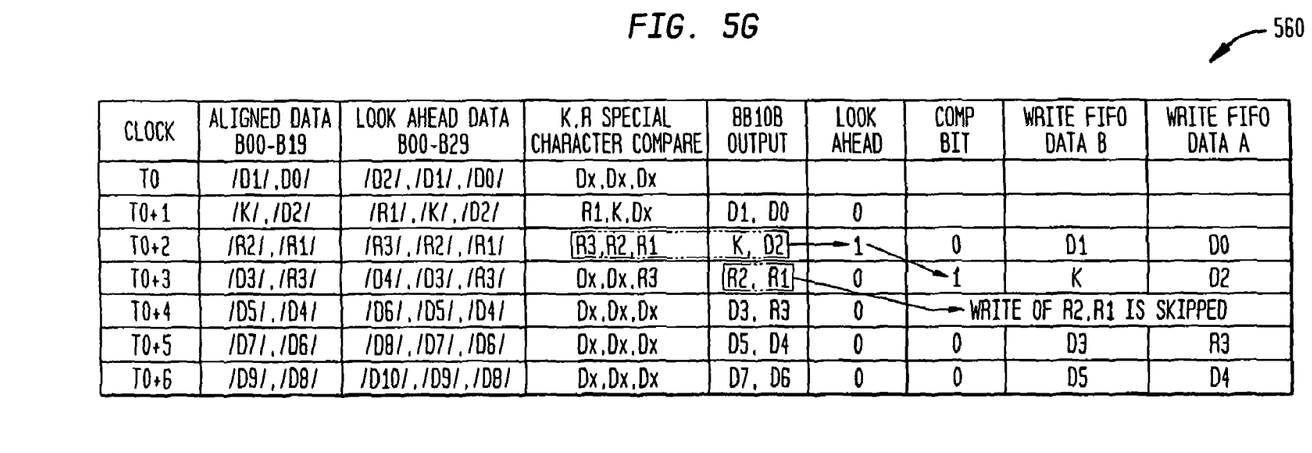
Figure 5H:
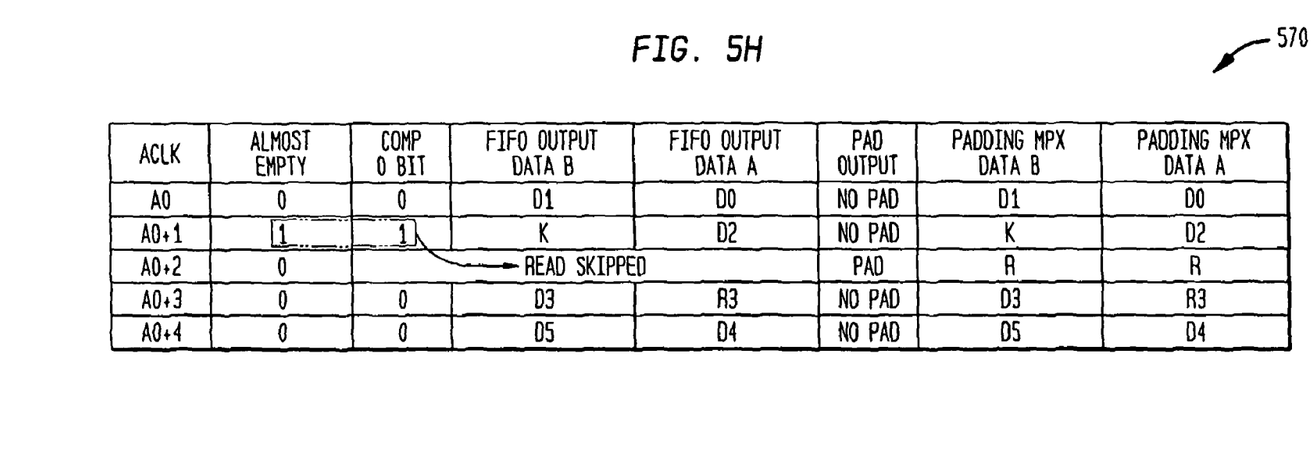
Figure 5I:
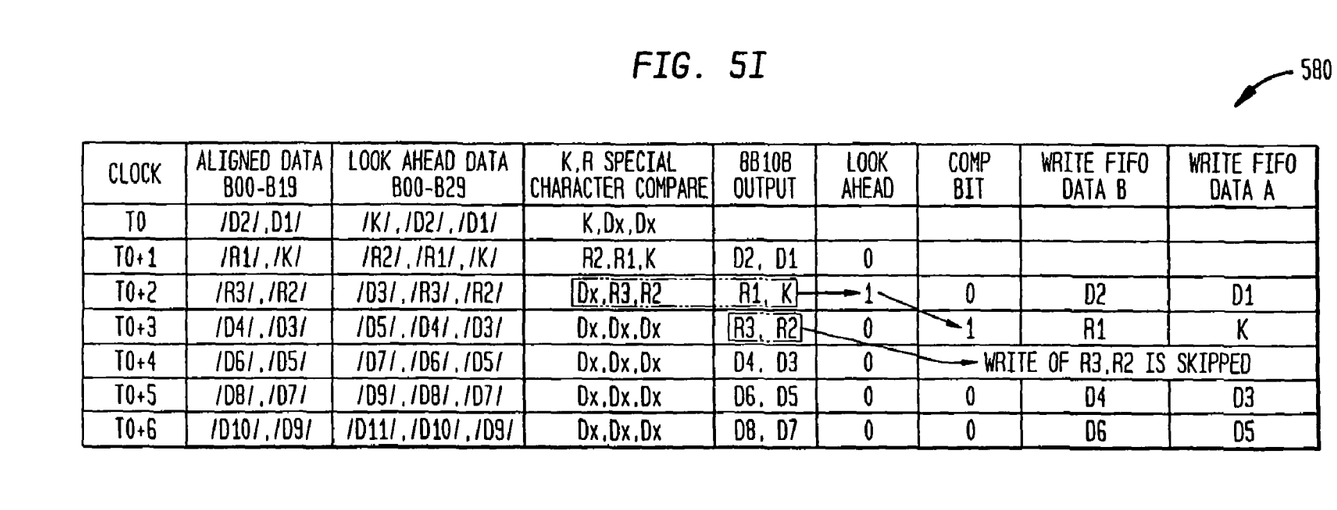
Figure 5J:
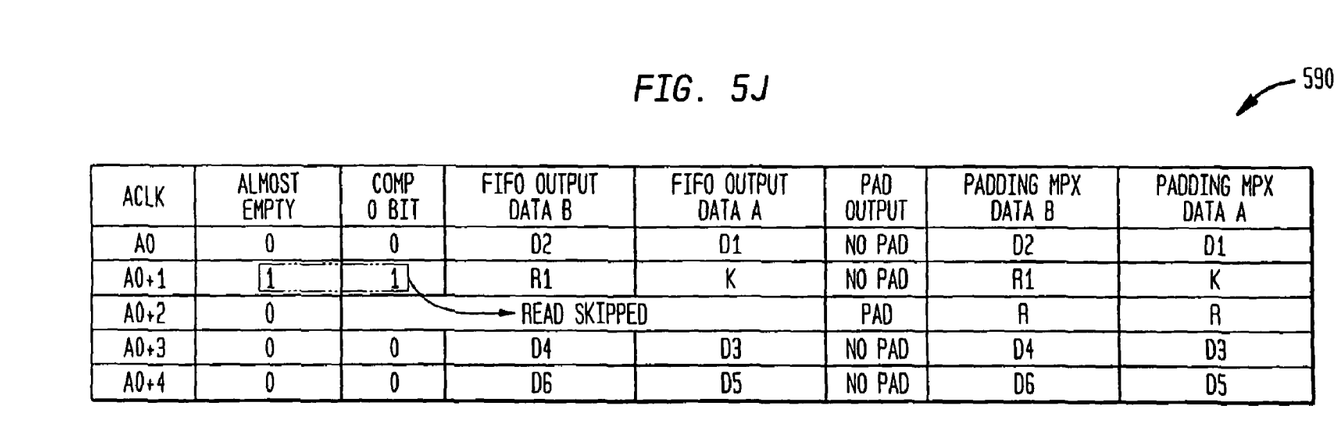

FIGS. 5A-5J illustrate FIFO input and output character sequences for other variations in data sequences and in the application clock and recovered clock. FIGS. 5A and 5B illustrate a different character sequence for the case when the application clock is faster than the recovered serial clock. FIGS. 5C and 5D illustrate a case for a first data sequence where almost empty is not asserted as a 1. FIGS. 5E and 5F illustrate a case for a second data sequence where almost empty is not asserted as a 1. When the almost empty signal is 0, as is the case for FIGS. 5C-5F, the FIFO is not close to the empty state, no read operations are skipped, and the padding of the output system data is not required. Other operational situations may occur, such as when the almost empty signal and the comp bit are both 1 for a single cycle as is shown in FIGS. 5G-5J. In this situation, the almost empty signal and the comp bit both being a 1 causes a read operation to be skipped and the system data output padded. The skipping of the read operation allows the FIFO to return almost empty to a 0 state due to write operations to the FIFO that are also occurring. In this case, the output is padded for only a single cycle.

Figure 6:
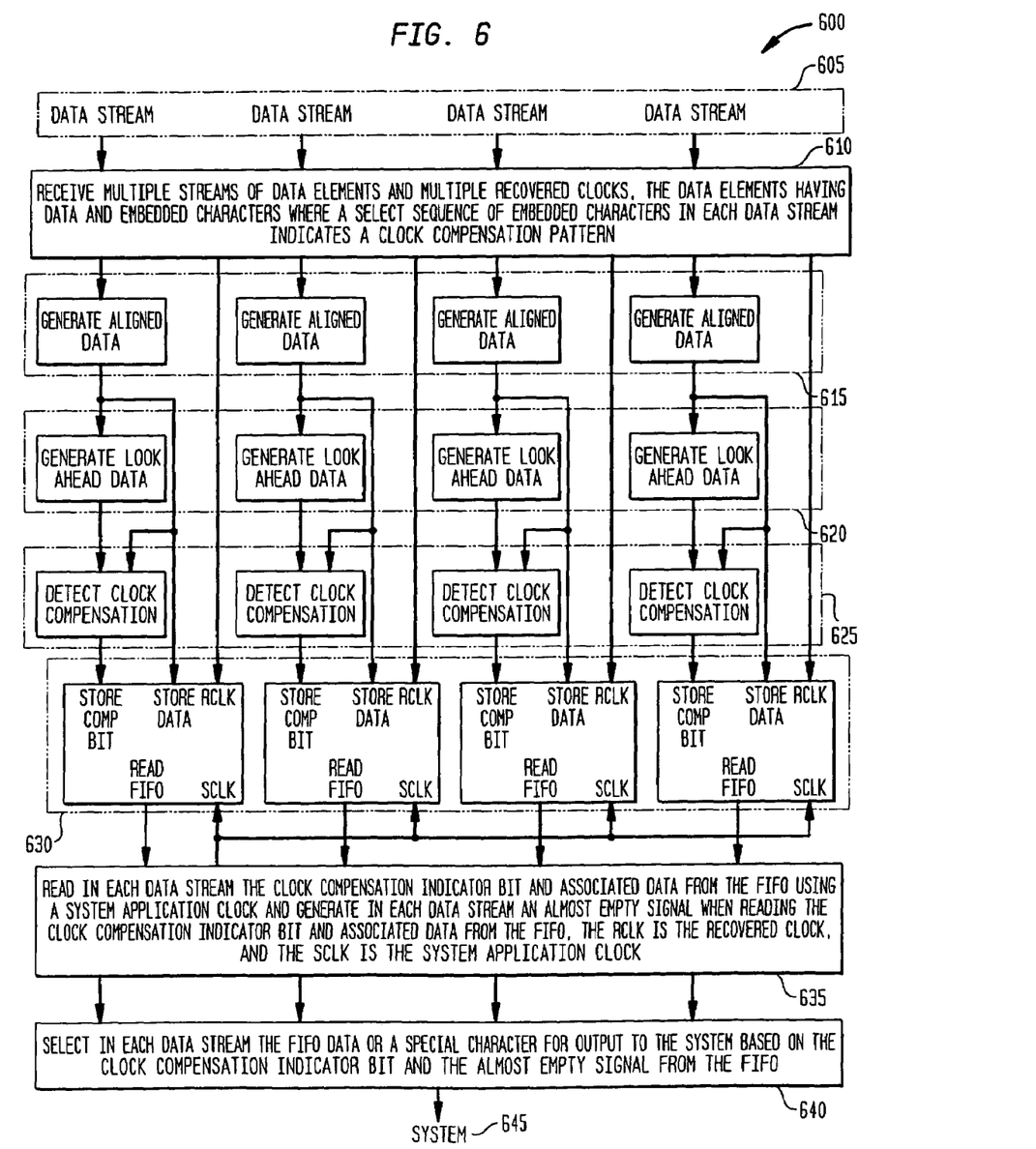
FIG. 6 illustrates a flow chart of operations for four parallel data streams in accordance with the present invention.

FIG. 6 illustrates a flow chart 600 of operations for four parallel data streams 605 in accordance with the present invention. In a first step 610, the multiple data streams and recovered clocks are received. Each data stream having data elements and embedded characters where a select sequence of embedded characters indicates a clock compensation pattern. In the next step 615, generate aligned data in each stream of data elements. In the next step 620, generate look ahead data for each stream of data elements. In the next step 625, in each data stream detect a clock compensation pattern when the clock compensation pattern is embedded in the data stream and generate a clock compensation indicator signal. In the next step 630, store in each data stream the data in a FIFO and the clock compensation indicator signal in a clock compensation indicator bit in a FIFO using the clock recovered from the data stream. In the next two steps included in 635, read in each data stream the data and clock compensation indicator bit from the FIFO using a system application clock and generate in each data stream an almost empty signal when reading the clock compensation indicator bit and associated data from the FIFO. In the next step 640, select in each data stream the FIFO data or a special character for output to the system 645 based on the clock compensation indicator bit and the almost empty signal from the FIFO.

While the present invention has been disclosed in a presently preferred context, it will be recognized that the present teachings may be adapted to a variety of contexts consistent with this disclosure and the claims that follow. For example, while the present invention was described as supporting four data channels, the invention is applicable to a single channel, two channels, or supporting more than four channels. It is also appreciated that by adding another stage of data transfer storage and a consequent additional cycle of latency, the determination of the clock compensation pattern can be obtained without use of the look ahead circuit. In this case, a latency of five to six cycles could be expected, which is still a substantial improvement over eight to ten cycles of latency.

I claim:

1. A method of clock compensation for one or more lanes of a serial data channel transferred through one or more corresponding first-in, first-out (FIFO) buffers, comprising the steps of:
   determining, for each FIFO buffer, a state of the FIFO buffer corresponding to a relative buffer occupancy of the FIFO buffer;
   aligning portions of data in the one or more lanes in the corresponding FIFOs;
   generating, for each lane, a recovered clock signal from the portions of data in the corresponding FIFO;
   dividing, for each FIFO buffer, the aligned portion of data in a corresponding lane into current aligned data and look-ahead data;
   determining, for each FIFO buffer, a location of a clock compensation pattern in the aligned portion of data from the look-ahead data;
   generating, for each FIFO buffer, a clock compensation indicator based on the recovered clock and the state of the FIFO buffer;
   selecting one FIFO buffer based on the corresponding state of the FIFO buffer and at least one clock compensation indicator; and
   adjusting the aligned portion of data in each FIFO buffer by the steps of:
      padding, if the state of the selected FIFO buffer indicates a relative empty state, the clock compensation pattern in the aligned portion of data, and
      dropping, if the state of the selected FIFO buffer indicates a relative full state, the clock compensation pattern in the aligned portion of data.

2. The invention as recited in claim 1, further comprising the steps of:
   writing, for each FIFO buffer, data of the corresponding lane into the FIFO buffer with the recovered clock signal of the lane; and
   reading, for each FIFO buffer, data of the corresponding lane out of the FIFO buffer with the application clock signal.

3. A circuit for clock compensation in one or more lanes of a serial data channel transferred through one or more corresponding first-in, first-out (FIFO) buffers, comprising:
   buffer state logic adapted to determine, for each FIFO buffer, a state of the FIFO buffer corresponding to a relative buffer occupancy of the FIFO buffer;
   aligner circuit adapted to align portions of data in the one or more lanes in the corresponding FIFOs, wherein, for each FIFO buffer, the aligned portion of data in a corresponding lane is divided into current aligned data and look-ahead data;
   clock generator adapted to generate, for each lane, a recovered clock signal from the portions of data in the corresponding FIFO;
   clock compensation logic adapted to i) determine, for each FIFO buffer, a location of a clock compensation pattern in the aligned portion of data from the look-ahead data, and ii) generate, for each FIFO buffer, a clock compensation indicator based on the recovered clock and the state of the FIFO buffer; and
   logic adapted to select one FIFO buffer based on the corresponding state of the FIFO buffer and at least one clock compensation indicator,
   wherein the logic is adapted to adjust the portion of data in each FIFO buffer by padding, if the state of the selected FIFO buffer indicates a relative empty state, the clock compensation pattern in the aligned portion of data, and dropping, if the state of the selected FIFO buffer indicates a relative full state, the clock compensation pattern in the aligned portion of data.

4. The invention as recited in claim 3, wherein:
   each FIFO buffer writes data of the corresponding lane into the FIFO buffer with the recovered clock signal of the lane; and
   each FIFO buffer reads data of the corresponding lane out of the FIFO buffer with the application clock signal.

5. A machine-readable storage medium, having encoded thereon program code, wherein, when the program code is executed by a machine, the machine implements a method for clock compensation for one or more lanes of a serial data channel transferred through one or more corresponding first-in, first-out (FIFO) buffers, comprising the steps of:
   determining, for each FIFO buffer, a state of the FIFO buffer corresponding to a relative buffer occupancy of the FIFO buffer;
   aligning portions of data in the one or more lanes in the corresponding FIFOs;
   generating, for each lane, a recovered clock signal from the portions of data in the corresponding FIFO;
   dividing, for each FIFO buffer, the aligned portion of data in a corresponding lane into current aligned data and look-ahead data;
   determining, for each FIFO buffer, a location of a clock compensation pattern in the aligned portion of data from the look-ahead data;
   generating, for each FIFO buffer, a clock compensation indicator based on the recovered clock and the state of the FIFO buffer;
   selecting one FIFO buffer based on the corresponding state of the FIFO buffer and at least one clock compensation indicator; and
   adjusting the aligned portion of data in each FIFO buffer by the steps of:
      padding, if the state of the selected FIFO buffer indicates a relative empty state, the clock compensation pattern in the aligned portion of data, and
      dropping, if the state of the selected FIFO buffer indicates a relative full state, the clock compensation pattern in the aligned portion of data.

6. The invention as recited in claim 5, further comprising the steps of:
   writing, for each FIFO buffer, data of the corresponding lane into the FIFO buffer with the recovered clock signal of the lane; and
   reading, for each FIFO buffer, data of the corresponding lane out of the FIFO buffer with the application clock signal.

* * * * *